Dec. 14, 1948.  L. E. GOBLE  2,456,182
FLEXIBLE JOINT ASSEMBLY
Filed Feb. 1, 1946
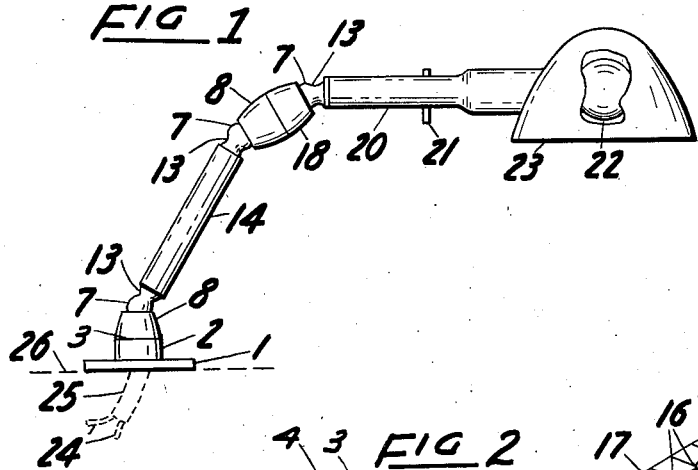
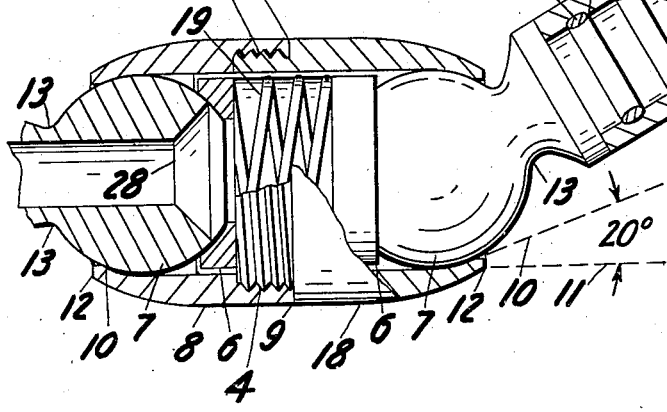
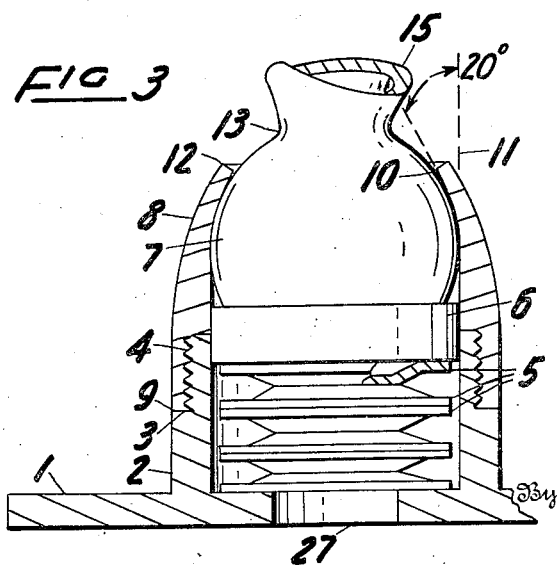
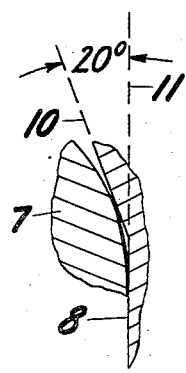
Inventor
Lawrence E. Goble
Attorney Patented Dec. 14, 1948

2,456,182

UNITED STATES PATENT OFFICE 2,456,182

FLEXIBLE JOINT ASSEMBLY

Lawrence E. Goble, Fostoria, Ohio, assignor to The Fostoria Pressed Steel Corporation, Fostoria, Ohio, a corporation of Ohio Application February 1, 1946, Serial No. 644,922

1 Claim. (Cl. 285—92)

This invention relates to definite positioning of devices in a wide range of locations from a single support, including a joint, or in series a plurality of joints in coordinated control.

This invention has utility when incorporated in universal joint assembly of links to carry a terminal device, as an electric light. The coordination involves a factor of safety or rather resistance to manual control in lever-like build-up back from the terminal device to the fixed support carrying the assembly. The resistance sequence at the device desirably is a slight factor above or beyond that to carry the device, with facility for manual shifting of the device from the minimum resistance of the joint most close in the assembly to the device. Any more departure range than thus available is transmitted to the next joint back from the device, by the more strong manual exertion at the device.

Referring to the drawings:

Fig. 1 is a side elevation of an embodiment of the invention in a link and joint assembly for an incandescent lamp device mounting;

Fig. 2 is an enlarged detail, with parts broken away, of an intermediate joint in the assembly of Fig. 1;

Fig. 3 is a section thru the base or mounting for the terminal joint of the assembly of Fig. 1; and Fig. 4 is a fragmentary diagrammatic illustration on a still more enlarged scale, showing the spheric zone portion and a conical coacting region providing a frustum face portion of a conical pyramid or cone.

Fixed to a machine part, table or desk may be a flange 1 having a cylindrical flange or collar 2 therefrom to a reduced diameter at a shoulder 3 with a further externally threaded portion 4. In complementary pairs centrally outwardly flared duct-providing spring washers 5 of the "Belleville" type are stacked to position an internal spheric zone member or bearing ring 6 as a complementary member for a sphere or ball joint member 7. Embracing the member 7 is a shell or housing member 8 coacting with the threaded portion 4 in lodging in a sealed relation 9 with the shoulder 3. At the predetermined grip or compressibility factor established in response to the spring washer stack 5, there is definite thrusting of the ball 7 outward as to the member 8 against cone frustum tangent region 10. With a line 11 in the full diameter of the ball 7 as the cylindrical portion interior for the cap member 8, coaxial therewith is the zone or rather frustum 10 at approximately 20° inward pitch. This tangent or straight taper portion 10 terminates in an opening 12, which in practice desirably has clearance approaching 45° or slightly in excess thereof, to a neck 13.

In adopting a general link assembly, a tube section 14 may have a pair of members 8 oppositely directed thereon before there be anchoring of terminal ball joint members 7 therewith. The anchoring is effected by thrusting tubular stem portion 15 from the throat 13 into the end of the tube 14. The stem 15 on its exterior has grooves or channels 16 circumferentially extending in parallel. Therein may be located brazing wire, which, upon heating provides fused bonding 17 of the stem 15 with the link tube 14. Care is taken to have the gage of the ball unit 7, 13, 15, at the throat 13 fully as strong as the tube 14. With the balls 7 of 7/8" and 1 1/8" diameters, the tube 14 is acceptable of a gage #20.

From the remote end of the link tube 14 is a complementary member 18 to the member 8, assembled to abut a shoulder 3 at the limit of its external threading 4. Here also is a sealed joint 9 for holding to a predetermined compression a helical spring 19, in lieu of "Belleville" spring washers 5. The common thrust here is both ways against zone rings 6. The housing 8, 18, is a minor link thrusting the balls 7 therefrom into definite frictional grip or resistance to ready shifting at tangent frustum regions 10.

The sequence herein is with a tubular arm 20 having a switch 21 for an incandescent light 22 directed by a reflector 23 as the terminal device in the assembly. Electric conductor stranded wires 24 with insulation covering 25 may be supplied thru a support 26 to enter central opening 27 in the mounting terminal fitting 1, 2. The stack of washers 5 provided a central way for the conductor wires to pass thru the ring 6 and enter polar port 28 in the ball 7. Therefrom there is tubular way continuity thru the stems 15, link or tubes 14, 20, ball ports 28, spring 19. At wiring assembly, the straight line lay out will permit ready threading of the wiring to the device.

Herein there is importance to holding up to initial established performance standards. The ball-stem unit desirably is a screw machine product of processed steel. Parts may be die cast, even of zinc or aluminum, as well as alloys. However, under the practices affording reliable results, surface treatment is undertaken, as by plating with cadmium. With the control at say 200# to 400# spring compression in a housing, oiling of the ball 7 as to the taper 10 has not tended to detract from the grip or holding as much as 12½%, while even with graphite the slip does not exceed 20%. The purpose is for dry or non-lubricated use, and the hard plating finish holds up satisfactorily for long continued performance, not as continued moving, but as shifting to set positions, such as normally required in lamps.

The compression thrust, while holding the zone ring 6 against the ball 7, locates the ball 7 for an approximately constant line contact circle bearing on the taper face 10. The complementary line contact constant circle bearing on the ball 7 is rocked or shifted as to the face of the ball. Force applied to the stem 15 moves the ball of the ball and socket joint, as to the socket.

While brazing is mentioned for the assembly of the stem 15 with the tubular link, in so doing a shaped heating end for the fusion effecting tool is desired to avoid or hold down too high a temperature which might act detrimentally upon the exterior finish of the tubular portions as exposed. Plastic or self-setting adhesive may be used to bond the stems 15 in the tubes, and thereby extend the range of finishes available not to be disturbed by assembly operations.

In a lineal series of the flexible joints, importance resides in establishing a relation for response to change or adjustment force applied thereto. A factor in such control is the degree or extent of holding from the high compression 5, 19, at the joint more close to the force applied. For a ratio of approximately 3-4-5, in a series of three joints in succession, pressure per square inch adopted for cadmium plated ball and socket is found at 200#, 300# and 400#. In foot pounds for ⅞" diameter ball, this shows up in the range of 5, 6, 8½. A more wide factor may be adopted, as 1, 2, 4. Adopting this schedule for the showing in Fig. 1, the tubular housing 8, 18, has a single compression spring means therein, so that it may be taken as 1. The different compressing at the housing unit 2, 8, may be taken as 2. From this it follows, one taking hold of the link portion 20, has first strain response to shifting at the joint 8, 18, combining 45° at each ball 7 for a maximum in the range of 90°. Further more intense strain may rock the tube 14 as much as 45° from vertical as to the base 2, 8.

What is claimed and it is desired to secure by Letters Patent is:

A ball and socket type of flexible joint comprising a stem and therefrom a throat having a spheric enlargement forming a friction face, a cylindrical socket snugly coacting with the enlargement friction face, said socket having at approximately 20° an inwardly tapering seat toward an opening of sufficient diameter to provide clearance at the throat for the stem to flex as much as 45° in a complete orbit, a ring in the socket spaced from the seat by the enlargement, said ring having annular clearance from the socket with a spheric seat complementary to the enlargement face and frictionally coacting therewith, the opposite side of the ring being a flat face, and thrust-effecting means coacting in the socket, including a compression helical spring of diameter approximating the diameter of the ring and coacting with the ring flat face to maintain gripping coaction between the ring seat and the enlargement in holding the enlargement at tangential complete peripheral engagement in the tapering seat.

LAWRENCE E. GOBLE.

REFERENCES CITED

The following references are of record in the file of this patent:

UNITED STATES PATENTS

| Number | Name | Date |
| --- | --- | --- |
| 757,143 | Reilly | Apr. 12, 1904 |
| 1,220,069 | Capdevila | Mar. 20, 1917 |
| 1,927,703 | Glowacki | Sept. 19, 1933 |
| 2,041,847 | Marchand | May 26, 1936 |
| 2,100,069 | Creveling | Nov. 23, 1937 |
| 2,303,642 | Hoy | Dec. 1, 1942 |